United States Patent
Jeyachandrasekar et al.

(10) Patent No.: US 11,750,599 B2
(45) Date of Patent: Sep. 5, 2023

(54) METHOD AND SERVER FOR AUTHENTICATION USING CONTINUOUS REAL-TIME STREAM AS AN AUTHENTICATION FACTOR

(71) Applicant: Wipro Limited, Bangalore (IN)

(72) Inventors: Naveen Kumar Jeyachandrasekar, Bangalore (IN); Kaki Sai Kiran, Bangalore (IN)

(73) Assignee: Wipro Limited, Bangalore (IN)

( * ) Notice: Subject to any disclaimer, the term of this patent is extended or adjusted under 35 U.S.C. 154(b) by 241 days.

(21) Appl. No.: 16/992,525

(22) Filed: Aug. 13, 2020

(65) Prior Publication Data

US 2021/0385199 A1    Dec. 9, 2021

(30) Foreign Application Priority Data

Jun. 4, 2020   (IN) .............................. 202041023563

(51) Int. Cl.
| | | |
|---|---|---|
| *H04L 9/40* | (2022.01) | |
| *H04L 9/32* | (2006.01) | |
| *H04W 12/065* | (2021.01) | |

(52) U.S. Cl.
CPC ........ *H04L 63/0853* (2013.01); *H04L 9/3234* (2013.01); *H04L 63/0442* (2013.01);
(Continued)

(58) Field of Classification Search
CPC ............. H04L 63/0853; H04L 63/0442; H04L 63/105; H04L 63/123; H04L 63/1433; H04L 63/08; H04L 9/3234; H04W 12/065

See application file for complete search history.

(56) References Cited

U.S. PATENT DOCUMENTS 9,801,066 B1   10/2017  Hanley et al.
10,057,227 B1   8/2018  Hess et al.
(Continued)

OTHER PUBLICATIONS

Uluagac, A. Selcuk; Liu, Wenyi; Beyah, Raheem; "A multi-factor re-authentication framework with user privacy," 2014 IEEE Conference on Communications and Network Security, San Francisco, CA, USA, 2014, pp. 504-505, doi: 10.1109/CNS.2014.6997526.*
(Continued)

*Primary Examiner* — Victor Lesniewski
(74) *Attorney, Agent, or Firm* — Finnegan, Henderson, Farabow, Garrett & Dunner, LLP

(57) ABSTRACT

The present invention discloses a method and a server for authentication adaptive to a secured application. The method comprising encrypting a part of continuous streams of random real-time data using a user's public key to form a first encrypted data when the request is received from a first entity, transmitting the first encrypted data to the first entity, wherein the first entity communicates the first encrypted data to a second entity, receiving a second encrypted data from the second entity, wherein the second encrypted data is created by decrypting the first encrypted data using a user's private key and encrypting the decrypted data using the user's private key, authenticating the second encrypted data received from the second entity by comparing data decrypted from the second encrypted data with the part of continuous streams of random real-time data stored in the authentication server and initiating action based on authentication.

20 Claims, 5 Drawing Sheets

(52) U.S. Cl.
CPC .......... *H04L 63/105* (2013.01); *H04L 63/123* (2013.01); *H04L 63/1433* (2013.01); *H04W 12/065* (2021.01)

(56) References Cited

U.S. PATENT DOCUMENTS

| | | | | |
|---|---|---|---|---|
| 2014/0237236 | A1* | 8/2014 | Kalinichenko | H04L 63/18 |
| | | | | 713/168 |
| 2014/0283016 | A1* | 9/2014 | Sambamurthy | H04W 12/069 |
| | | | | 726/19 |
| 2015/0215299 | A1* | 7/2015 | Burch | H04W 12/069 |
| | | | | 726/5 |
| 2015/0220718 | A1* | 8/2015 | Hong | H04L 63/18 |
| | | | | 726/9 |
| 2016/0050565 | A1* | 2/2016 | Benoit | H04L 63/18 |
| | | | | 726/9 |
| 2017/0302659 | A1* | 10/2017 | Shteingart | H04W 12/065 |
| 2019/0044942 | A1* | 2/2019 | Gordon | H04L 63/107 |
| 2021/0182370 | A1* | 6/2021 | Melnikov | G06N 20/00 |
| 2021/0258308 | A1* | 8/2021 | Avetisov | H04L 9/3234 |

OTHER PUBLICATIONS

Fu, Shen; Wymore, Mathew L.; Chang, Ting-Wei; Qiao, Daji; "Continuous User Authentication Based on Context-Emphasized Behavior Profiling," 2019 IEEE 43rd Annual Computer Software and Applications Conference (COMPSAC), Milwaukee, WI, USA, 2019, pp. 598-603, doi: 10.1109/COMPSAC.2019.10273.*

* cited by examiner

METHOD AND SERVER FOR AUTHENTICATION USING CONTINUOUS REAL-TIME STREAM AS AN AUTHENTICATION FACTOR

TECHNICAL FIELD

The present subject matter is generally related to a field of transaction security, more particularly, but not exclusively, to a method and a server for authentication of a transaction using continuous real-time data stream as an authentication factor.

BACKGROUND

In a Multi Factor Authentication (MFA) system, a user needs to present two or more evidences of his/her identity to an authentication system, which grants access to the user post successful verification of user's identity. The MFA system relies on verification of user's identity based on what user knows such as username, password, Personal Identification Number (PIN) and the like, or based on what user is such as user photo, biometric data and the like, or based on what user has such as access cards, Universal Serial Bus (USB) dongles, phone number, email ID and the like. One Time Password (OTP) along with username and password is a widely used 2 Factor Authentication (2FA) system in which a user enters a username and password in an online application as first factor authentication. The 2FA system verifies the provided data and grants access to the user to establish an online application session or to complete a digital transaction. OTP in general as well as Short Message Service (SMS) based OTP as a factor of authentication has many shortcomings. For instance, OTP is usually sent as plain text SMS to user's mobile phone. This method is vulnerable to Subscriber Identification Module (SIM) swap or SIM clone attacks where a hacker misleads carrier to redirect data of a particular user to a cloned (fake) SIM card. Secondly, OTP sent as plain text SMS is not secure and can easily be stolen by people in the vicinity of a user. So, entering the correct OTP does not guarantee that the person is an authorized user. Thirdly, a weak OTP generation algorithm can lead to easy predictability of the subsequent OTPs making the MFA system vulnerable. Additionally, entering an OTP repeatedly and intermittently during an online session or transaction to maintain security is cumbersome and can lead to bad user experience.

The information disclosed in this background of the disclosure section is for enhancement of understanding of the general background of the invention and should not be taken as an acknowledgement or any form of suggestion that this information forms the prior art already known to a person skilled in the art.

SUMMARY

There is a need for an improved solution to provide continuous session security with reduced vulnerability to interception in a manner adaptive to the security requirements of a particular application.

In an embodiment, the present disclosure may relate to a method of authentication adaptive to a secured application, when the secured application initiates an authentication request. The method includes receiving a request for authentication of a session of the secured application initiated on a first entity, encrypting a part of continuous streams of random real-time data using a user's public key to form a first encrypted data when the request is received, transmitting the first encrypted data to the first entity, wherein the first entity communicates the first encrypted data to a second entity and receiving a second encrypted data from the second entity. The second encrypted data is created by decrypting the first encrypted data using a user's private key to get the part of continuous streams of random real-time data and encrypting the part of continuous streams of random real-time data using the user's private key. The method further includes authenticating the second encrypted data received from the second entity by comparing data decrypted from the second encrypted data with the part of continuous streams of random real-time data stored in the authentication server, initiating first action to allow access or to continue the access to the session of the secured application when the authentication is successful and initiating second action to terminate the session of the secured application when the authentication is unsuccessful.

In an embodiment, the present disclosure may relate to an authentication server for authentication adaptive to a secured application. The server may include a processor and a memory communicatively coupled to the processor, wherein the memory stores processor-executable instructions, which on execution, cause the processor to receive a request for authentication of a session of the secured application initiated on a first entity, encrypt a part of continuous streams of random real-time data using a user's public key to form a first encrypted data when the request is received, transmit the first encrypted data to the first entity, wherein the first entity communicates the first encrypted data to a second entity and receive a second encrypted data from the second entity. The second encrypted data is created by decrypting the first encrypted data using a user's private key to get the part of continuous streams of random real-time data and encrypting the part of continuous streams of random real-time data using the user's private key. The server further causes the processor to authenticate the second encrypted data received from the second entity by comparing data decrypted from the second encrypted data with the part of continuous streams of random real-time data stored in the authentication server, initiate first action to allow access or to continue the access to the session of the secured application when the authentication is successful and initiate second action to terminate the session of the secured application when the authentication is unsuccessful.

In an embodiment, the present disclosure may relate to a non-transitory computer readable medium including instructions stored thereon that when processed by at least one processor cause an authentication server to perform operations comprising receiving a request for authentication of a session of the secured application initiated on a first entity, encrypting a part of continuous streams of random real-time data using a user's public key to form a first encrypted data when the request is received, transmitting the first encrypted data to the first entity, wherein the first entity communicates the first encrypted data to a second entity; receiving a second encrypted data from the second entity, wherein the second encrypted data is created by decrypting the first encrypted data using a user's private key to get the part of continuous streams of random real-time data and encrypting the part of continuous streams of random real-time data using the user's private key, authenticating the second encrypted data received from the second entity by comparing data decrypted from the second encrypted data with the part of continuous streams of random real-time data stored in the authentication server, initiating first action to allow access or to continue the access to the session of the secured application when the authentication is successful, and initiating second action to terminate the session of the secured application when the authentication is unsuccessful.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

Figure 1:
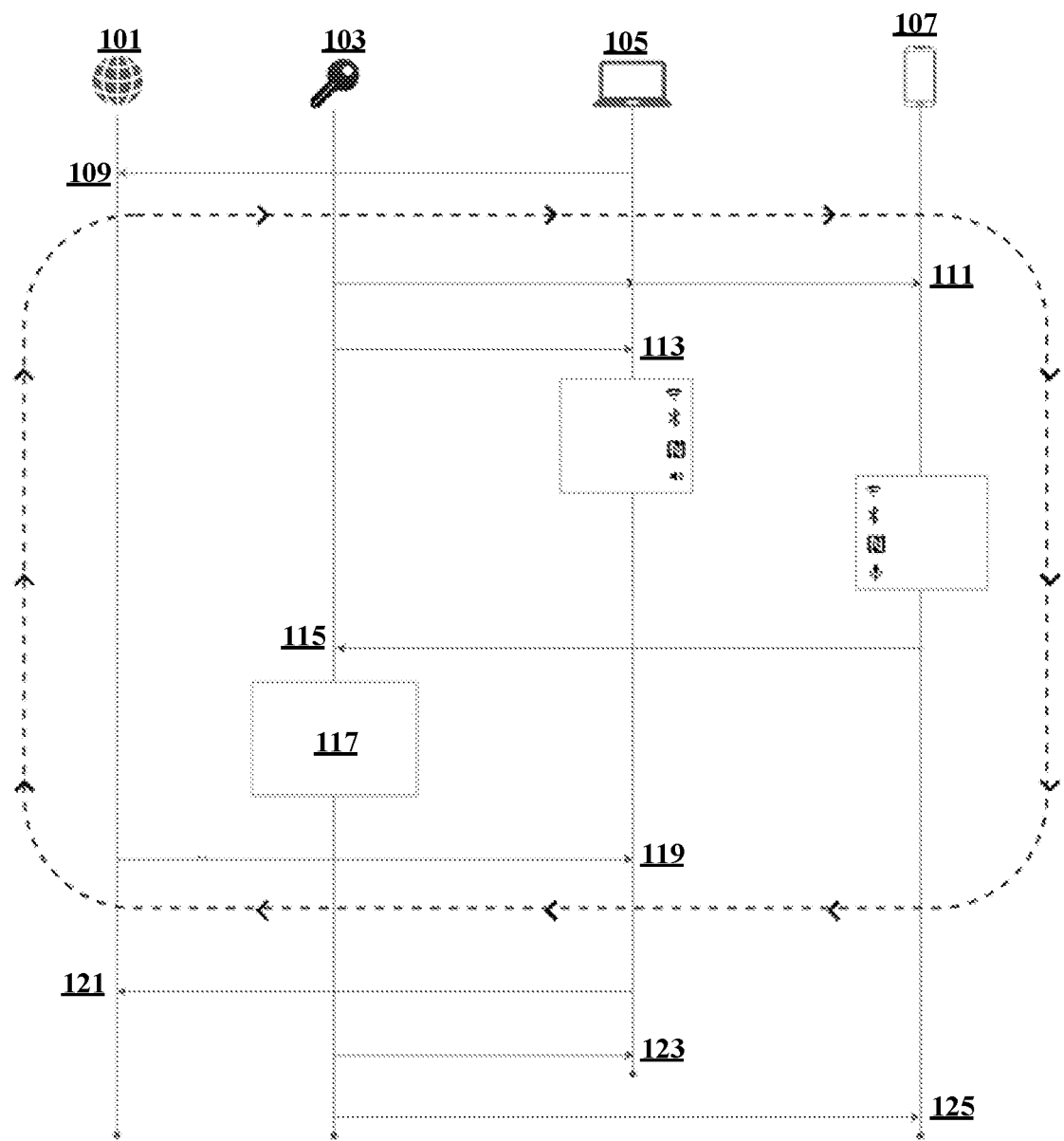
FIG. 1 illustrates an exemplary environment for authentication using continuous real-time data stream as an authentication factor in accordance with some embodiments of the present disclosure.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to an authentication server and method for authentication using continuous real-time data stream as a factor of authentication. The present disclosure utilizes generation of random continuous streams of data based on dynamic parameters calculated and application specific random severity score. The dynamic parameters include at least one of, but not limited to, matching factor, maximum acceptable time delay, buffer size of the first entity and the second entity, type of data, data rate, the type of the secured application, type of the first entity and the second entity, network latency among the authentication server, the first entity and the second entity, type of communication mechanism used between the first entity and the second entity, and technical limitations of the communication mechanism used between the first entity and the second entity. The application specific random severity score relates to the security requirement of the application session being authenticated. Based on the severity score, the authentication server chooses the most appropriate algorithm amongst a plurality of randomness generation algorithms for generation of continuous data streams. The data stream is sliced, formatted and encrypted using the application user's public key for transmission to a first entity of the user accessing the application session. The data stream is modulated and relayed to the registered second entity of the user that decrypts the data stream using the previously stored private key of the user. The second entity then encrypts the data stream using the user's private key. On retransmission of the encrypted data stream to the authentication server, the server verifies the authenticity of the sender's device, by decrypting the data or verifying signature of data received from the second entity. The authentication server then compares the two data streams—one that is stored in the server before being transmitted to the first entity and one that is decrypted after receiving data from the second entity and computes a matching factor considering the time delay, loss in data, etc. If the computed matching factor value is more than expected value, the identity of user is considered as verified and therefore, the user is granted access to a system or to establish, maintain an online application session or to complete a transaction. The matching factor determination (based on comparison of continuous real-time data stream) and verification against expected threshold continues till user logs out of the system or till end of established application session or till completion of a transaction. If the computed matching factor value fails to achieve the expected threshold value, at any point of time, the authentication server immediately informs the service provider to stop all access to the user. The user is then immediately stopped from completing his/her digital transaction. If an online session was already established, the session is immediately terminated, and the user is logged out. This authentication approach provides a seamless user experience without interrupting the user and at the same time the data stream is secured and cannot be tampered.

FIG. 1 illustrates an exemplary environment for authentication using continuous real-time data stream as an authentication factor in accordance with some embodiments of the present disclosure.

As shown in the FIG. 1, the environment includes a service provider 101, an authentication server 103, a first entity 105 and a second entity 107. The service provider 101 may be a company or an organization that provides services for its users. The users may be subscribers or access services provided by the service provider 101 as a guest. Some of the examples of service provider 101 may be, but not limited to, Application Service Providers (ASP) and Storage Service Providers (SSP). The service provider 101 may comprise a Service Provider Unit (SPU, not shown in FIG. 1) placed at the service provider end. The SPU may relate to a particular application provider which would require the initiation of authentication process (described later). The service provider 101 may communicate with the authentication server 103, the first entity 105 and the second entity 107 through wired/wireless communication protocols/methods. The communication protocols/methods may include, but is not limited to, a direct interconnection, an e-commerce network, a Peer-to-Peer (P2P) network, Local Area Network (LAN), Wide Area Network (WAN), wireless network (for example, Code-Division Multiple Access (CDMA), High-Speed Packet Access (HSPA+), Global System for Mobile communications (GSM®), Long-Term Evolution (LTE®) and Worldwide interoperability for Microwave access (WiMax®)), Internet, Wi-Fi, Bluetooth and the like.

In an embodiment, the authentication server 103 may be a server for performing authentication using continuous real-time data stream as an authentication factor and adaptive to a secured application. The authentication server 103 may communicate with the first entity 105 and the second entity 107 through wired/wireless communication protocols/methods. The communication protocols/methods may include, but is not limited to, a direct interconnection, an e-commerce network, a Peer-to-Peer (P2P) network, Local Area Network (LAN), Wide Area Network (WAN), wireless network (for example, Code-Division Multiple Access (CDMA), High-Speed Packet Access (HSPA+), Global System for Mobile communications (GSM®), Long-Term Evolution (LTE®) and Worldwide interoperability for Microwave access (WiMax®)), Internet, Wi-Fi, Bluetooth and the like.

The first entity 105 and the second entity 107 may be any electronic device such as a smartphone, a laptop, a desktop, a tablet, a smartwatch and the like. A skilled person may understand that any smart electronic device that allows a user to connect to Internet and avail services provided by service providers can be part of this disclosure. In an embodiment, the first entity 105 and the second entity 107 may be same device. In another embodiment, the first entity 105 and the second entity 107 may be different devices. The first entity 105 and the second entity 107 may include Entity Control Units (ECU, not shown in FIG. 1). These units may be responsible for continuously monitoring and controlling various units within the entities i.e. the first entity 105 and the second entity 107. The functionalities of the ECU may include controlling the size of the buffer to be used in the entity, controlling the rate at which the data from the buffer can be retrieved, modulated and sent, initiating, establishing and maintaining the connectivity whenever needed by using Connectivity Unit (CU), attempting retries in sending the data between entities or authentication server 103, whenever there is a failure in data transmission, receiving and responding to configuration parameters from Master Control Unit (MCU 203, shown in FIG. 2) of the authentication server 103 and adjusting its working. Furthermore, the first entity 103 may include first Entity Data Modulation Unit (EDMU). This unit may be responsible for modulating the data before transmitting it to the second entity 105. This unit may convert or modulate the input data blocks to an output signal that can be transmitted using a chosen communication mechanism. Similarly, the second entity may include second Entity Data Demodulation Unit (EDDU). This unit, depending on the chosen communication mechanism, may demodulate the received data from the first entity 105 before it can be processed further. Example of this may be the usage of a microphone to receive the analogue audio signal and to convert it to digital format either for processing or for transmitting over to the authentication server 103. The communication mechanism between the first entity and the second entity may comprises, but not limited to, wired, Wi-Fi, Bluetooth, Near Field Communication (NFC) and modulation techniques to convert data to audio, video, vibration and light transfer.

The working of the authentication server 103 of the present disclosure with respect to the service provider 101, the first entity 105 and the second entity 107 is explained below.

In the present disclosure, the second entity 107 may be installed with the service provider 101 application (such as banking application) and subsequently, authenticated through a one-time registration process. Once the second entity 107 is authenticated through registration, a user may use the service provider 101 application whenever the user wants to avail services from the service provider 101 in future. Once the registration process is complete, the second entity 107 may generates a key-value pair (Public Key+ Private Key) and may store the Private Key within a Key Store (not shown in FIG. 2) of the second entity 107 in a secure way. The second entity 107 may provide the Public Key to the authentication server 103 to be used for communications thereafter. Once the required application is installed in the second entity 107, registration process for the installed application is complete and the Public Key is sent to the authentication server 103, the setup is now ready to be used for any further transactions. Likewise, if the user opts to use more devices as the second entity 107, the user may need to install relevant application and perform the registration process for each of the devices. Thereafter, any of these devices may be selected as the second entity 107 while authenticating with the server 103. For each of the device that is registered to be used as the second entity, the respective Public Keys may be communicated to the authentication server 103 after the device's registration.

The entity that the user may be primarily using to access a system, or an online service is referred to as the first entity 105 hereafter. To access the system or the service, the user may first begin by performing first factor authentication using his credentials or physical device such as USB dongle, card and the like (shown as reference 109 in FIG. 1). After successful first factor authentication, the user may select one of his/her devices that are registered as the second entity 107 and may, also, be required to start the service provider application on the second entity (which might involve providing a PIN or password) to initiate communication with the authentication server 103 (shown as reference 111 in FIG. 1). Once the second entity application is started, the authentication server 103 may now retrieve the user's Public Key, which was previously communicated during the user device registration process. Then, the authentication process begins and the service provider 101 may trigger the Master Control Unit (MCU 203, shown in FIG. 2) of the authentication server 103. Upon receiving the request, the MCU may invoke Dynamic Parameters Configuration Unit (DPCU 201, shown in FIG. 2) to initiate the process of dynamic parameter calculation. The DPCU may configure the Entity Control Units (ECU, not shown in FIG. 2) in entities i.e. the first entity 105 and the second entity 107 with the calculated parameter values. At this point, sample test data may be sent to the first entity 105 and may be received from the second entity 107 to calculate the network latency. The MCU may detect the technical capabilities of the entities i.e. the first entity 105 and the second entity 107 by communicating with their respective ECUs. The values received may passed on to the DPCU where matching factor and maximum acceptable time delay are calculated and sent back to the MCU.

Once the dynamic parameters are configured and the respective ECUs of the entities i.e. the first entity 105 and the second entity 107 are informed to start reception of data, the MCU may trigger Continuous Data Stream Generator Unit (CDGU 205, shown in FIG. 2) to start random data stream generation. This unit may be responsible for generating continuous stream of random real-time data. The stream of data generated may be true random or pseudo random depending on the security requirement of the application. For example, authentication for banking applications may use entropy based true random data stream while authentication for computer system or premise may use pseudo random data stream. Further, this data may get encrypted using user's Public Key. The nature of random data and rate at which the data is generated may be controlled by the MCU.

The Random Data Controller Unit (RDCU, not shown in FIG. 2) may be a part of CDGU of the authentication server 103 may use random severity score, data rate provided by the MCU and one or more functions FnX for random number generation. The random severity score may be in the range of 1 to 5 with 1 indicating lowest severity and 5 indicating highest severity. The RDCU may select an algorithm-based pseudo random number generator function for low severity and entropy based true random number generator function for high severity.

An exemplary function, which generates random numbers is shown below:

$$Fn1 = Pa[Po(x1) + Po(x2) + Po(xn)]$$

where x1, x2, . . . xn are time stamps,
Po(x) may return a position number based on value of x,
Pa[y] may return a random number by hashing and combining the hexadecimal octet values at position Po(x) of packet received in network controller.

Another exemplary function FnX may be that the function returns audio samples from an audio input. The RDCU may use audio codec to convert the audio samples to a format such as MP3.

Figure 2:
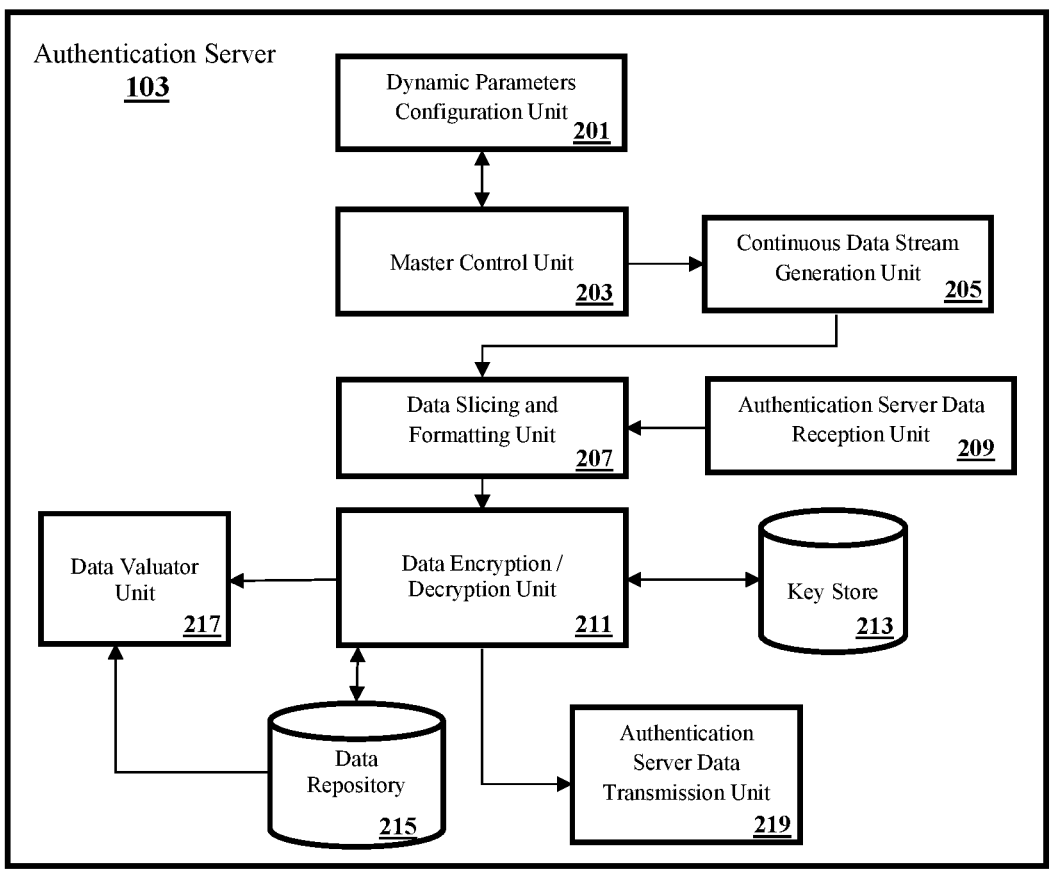
FIG. 2 shows a detailed block diagram of an authentication server in accordance with some embodiments of the present disclosure.

The stream of data that is continuously generated may get sliced according to the value set by the MCU. The data slice value may change dynamically and continuously based on the values calculated by the DPCU. As the data stream gets sliced, it may get formatted as required by Data Slicing and Formatting Unit (DSFU 207, shown in FIG. 2). The formatted data may be then stored in Data Repository (215, as shown in FIG. 2) which is to be used for further data validation. The Data Encryption/Decryption Unit (EDU 211, as shown in FIG. 2) may receive the formatted data and may encrypt it using the user's Public Key, retrieved from the Key Store (213, shown in FIG. 2). Before the start of data transmission between the entities i.e. the first entity 105 and the second entity 107, the ECUs may trigger their respective Connectivity Unit (CU, not shown in FIG. 2) to establish a connection between the entities using a communication mechanism. The communication mechanism between the first entity 105 and the second entity 107 may comprise, but not limited to, wired, Wi-Fi, Bluetooth, Near Field Communication (NFC) and modulation techniques to convert data to audio, video, vibration and light transfer. As the data may get encrypted at the authentication server 103, it may be stored in the buffer. The buffered data may be retrieved by the Authentication Server Data Transmission Unit (ASDTMU 219, shown in FIG. 2) in the authentication server 103 and may be transmitted to the first entity 105. As the data gets transmitted, its timestamp may be stored against the unencrypted data in the Data Repository (shown in FIG. 2).

The first entity's Data Reception Unit (DRU, not shown in FIG. 2) may receive the data from the authentication server 103 and stores it in the buffer (shown as reference 113 in FIG. 1). The data from the buffer may then retrieved, modulated (if required) and transmitted to the second entity 107 with the help of the first entity's Data Transmission Unit (DTU, not shown in FIG. 2). If there are any data transmission failures, the ECU may trigger to retransmit the data using the DTU. During the data transmission process, if there is a communication disconnect, it may be detected, and the communication may be re-established by Connectivity Unit (CU).

As the second entity's DRU receives data from the first entity 105, it may be demodulated (if required) and stored in the buffer. The data from the buffer may be then retrieved, decrypted, encrypted using the EDU by retrieving the user's Private Key from the Key Store (not shown in FIG. 2) of the second entity 107. Once the data encryption is done, the DTU of the second entity 107 may transmit the data to the authentication server 103 (shown as reference 115 in FIG. 1). Any failures in transmission of data may be retried by CU, which in turn is controlled by ECU of the second entity 107. In one embodiment, when the second entity 107 transmits the data to the authentication server 103 it does not use the same channel through which it received data from the first entity 105.

The Authentication Server Data Reception Unit (ASDRU 209, shown in FIG. 2), upon receiving the data, may slice the data in the DSFU and may decrypt using EDU. The EDU may retrieve the user's Public Key from the Key Store for decryption of the received data. After decryption, the data may be validated at the Data Valuator Unit (DVU 217, shown in FIG. 2). The DVU may retrieve the stored data and the timestamps from the Data Repository, may derive the matching factor and time delay values. These values may be then compared against the expected matching factor and maximum acceptable time delay values (calculated by the DPCU) (shown as reference 117 in FIG. 1). If the requirements are met, data validation may be considered as successful. On successful validation of data, the user may be granted access or may be allowed to continue his/her access to the services provided (shown as references 119, 121, 123 and 125 in FIG. 1). If the data valuation fails, further access to all the services may be denied.

FIG. 2 shows a detailed block diagram of an authentication server in accordance with some embodiments of the present disclosure.

The authenticating server 103 may comprise of Dynamic Parameters Configuration Unit (DPCU) 201, Master Control Unit (MCU) 203, Continuous Data Stream Generator Unit (CDGU) 205, Data Slicing and Formatting Unit (DSFU) 207, Authentication Server Data Reception Unit (ASDRU) 209, Data Encryption/Decryption Units (EDU) 211, Key Store 213, Data Repository (DR) 215, Data Valuator Unit (DVU) 217, Authentication Server Data Transmission Unit (ASDTMU) 219 and Entity Connectivity Units (CU, not shown in FIG. 2).

In the embodiment, the one or more units of the authentication server 103 mentioned-above may be implemented as dedicated hardware units. As used herein, the term unit refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The said one or more units when configured with the functionality defined in the present disclosure will result in a novel hardware.

Master Control Unit (MCU) 203: This unit may be responsible for continuous control of different units within the authentication server 103. It may, also, continuously control the first entity 105 and the second entity by communicating with their respective ECUs. The MCU 203 in turn may communicate with the DPCU 201 to take into account various factors dynamically to decide the configuration parameters. The MCU 203 based on the configuration parameters may perform the functionalities such as decide the rate at which the continuous random stream data is generated, configure the continuous random stream data with size of each packet (from random stream data), dynamically set the matching factor and the maximum acceptable time delay which is be used by DVU 217, control the rate at which the data packets are stored within the authentication server 103, control the size of the buffer to provide enough storage before the data can actually be processed, communicate with the ECUs within the first entity 105 and the second entity 107, which in turn controls the first entity 105 and the second entity 107, respectively.

Continuous Data Stream Generator Unit (CDGU) 205: This unit may be responsible for generating continuous stream of random real-time data. The stream of data generated may be true random or pseudo random depending on the security requirement of the application. For example, authentication for banking applications may use entropy based true random data stream while authentication for computer system or premise may use pseudo random data stream. Further, this data may get encrypted using user's Public Key. The nature of random data and rate at which the data is generated may be controlled by the MCU 203. The Random Data Controller Unit (RDCU, not shown in FIG. 2) may be based on random severity score and data rate provided by the MCU 203 and one or more functions FnX for random number generation.

The random severity score may be in the range of 1 to 5 with 1 indicating lowest severity and 5 indicating highest severity. The RDCU may select an algorithm-based pseudo random number generator function for low severity and entropy based true random number generator function for high severity.

An exemplary function which generates random numbers is shown below:

$$Fn1=Pa[Po(x1)+Po(x2)+Po(xn)]$$

where x1, x2, . . . xn are time stamps,

Po(x) shall return a position number based on value of x,

Pa[y] shall return a random number by hashing and combining the hexadecimal octet values at position Po(x) of packet received in network controller.

Another exemplary function FnX may be that the function returns audio samples from an audio input. The RDCU can use audio codec to convert the audio samples to a format such as MP3. The function FnX may return a random number of certain size (like 128 bits) based on entropy data, timestamp, and the like. The RDCU depending on the required data rate may invoke one or more functions FnX multiple times per second to generate the required random number stream.

Data Encryption/Decryption Units (EDU) 211: These units may be responsible for encryption and decryption of the continuous real-time data stream using the user's Public and Private Key. These units may retrieve the user's Public Key from the Key Store 213 to encrypt and/or decrypt data.

Figure 4:
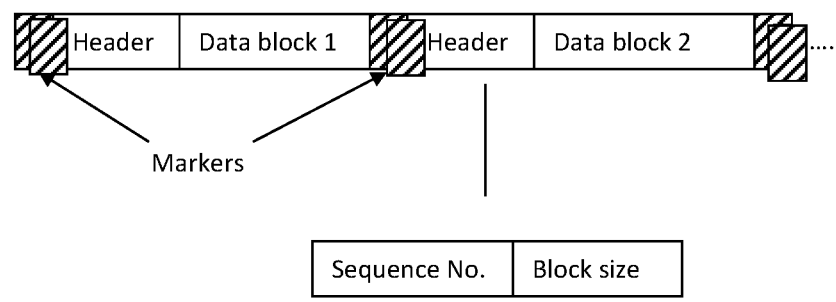

Data Slicing and Formatting Unit (DSFU) 207: This unit may be responsible for slicing the data stream coming from CDGU 205 or from the ASDRU 209, according to the packet size configured by the MCU 203. Slicing the data stream may involve dividing the data stream into finite data blocks of certain size based on the markers included in the data stream. The sliced data blocks corresponding to the generated data stream by CDGU 205 may be formatted before transmission. Formatting may include adding markers between data blocks, adding headers to each data block, which may include sequence number, size of data blocks and the like. An example of data formatting process is shown in the FIG. 4.

Entity Connectivity Units (CU): These units may be responsible for establishing and maintaining the communication between the first entity 105 and the second entity 107. The communication mechanism may be chosen considering various factors such as the capability of the first entity 105 and the second entity 107, type of the first entity 105 and the second entity 107, distance between the entities and the like. This unit may, also, detect any disruption in the communication and may reconnect or re-establish the communication between the entities i.e. the first entity 105 and the second entity 107.

Authentication Server Data Transmission Unit (ASDTMU) 219: This unit may be responsible for data transmission from source to the target using the chosen communication mechanism. In case of communication between the authentication server 103 and respective entities (the first entity 105 or the second entity 107), the communication mechanism may use, but not limited to, web socket and in case of communication between the first entity 105 and the second entity 107, the communication mechanism may use, but not limited to, connectivity protocols such as wired, Wi-Fi, Bluetooth, NFC, etc or may use modulation techniques to convert data to audio, vibration, light, etc. The CU may establish connection between the entities and the ASDTMU 219 may be responsible for transferring data to the first entity and then to second entity over the established connection.

Authentication Server Data Reception Unit (ASDRU) 209: This unit may be responsible for receiving the data from the second entity using the chosen communication mechanism. The communication mechanism used to receive data may vary as described in ASDTMU 219. The CU may establish connection between the entities and the ASDRU 209 may be responsible for receiving data over the communication mechanism.

Dynamic Parameters Configuration Unit (DPCU) 201: This unit may be responsible for dynamically and continuously calculating various parameters such as matching factor, maximum acceptable time delay, buffer size of individual entities, type of data, data rate, etc., by considering various factors like the type of application, type of user device, network latency among the authentication server 103, the first entity 105 and the second entity 107, the type of communication mechanism used between the first entity 105 and the second entity 107, technical limitations of the chosen communication mechanism, etc. This unit may re-calculate and adjust the parameters as and when needed in a continuous manner for a seamless user experience during the entire session, without compromising the security.

For example, if the parameters and corresponding values as below:

| Parameter | Value |
| --- | --- |
| Type of application | Banking |
| Type of the second entity 107 | Smart watch |
| Communication mechanism between the first entity 105 and the second entity 107 | Bluetooth |
| Average throughput between the first entity 105 and the second entity 107 | 1000 kbps |
| Average network latency | 50 ms |

Then DPCU 201 may calculate the parameters as shown below:

| Parameter | Value |
| --- | --- |
| Type of data | Raw data stream |
| Data rate | 800 kbps |
| Matching factor | 0.9 |
| Maximum acceptable time delay | 60 ms |
| Maximum session length | 492 seconds |

Data Repository (DR) 215: In the authentication server 103, as the data stream may continuously generated and transmitted to the first entity 105, the data blocks along with the timestamps may be stored in the buffer or in the DR 215, which is later used by the DVU 217 to validate the data and grant access to user.

Key Store 213: This unit may be responsible for the storage and maintenance of user's key pairs (Private Key in case of second entity and Public Key in case of authentication server) in a secure way. The second entity 107 and the authentication server 103 may retrieve the required user key from the Key Store 213 to encrypt/decrypt the data blocks or to verify the signature of the data blocks.

Data Valuator Unit (DVU) 217: This unit may be responsible for validating the incoming data stream from the second entity 107 (after slicing and decryption). The DVU 217 may compare the original data sent (stored in DR 215) with the received data and may derive the matching factor and time delay values. This derived matching factor and time delay values may be compared against expected threshold value (calculated by the DPCU 201). If the requirements are met, the data validation may be considered as successful. On successful validation of data, user may be granted access to the services without interruption. In case of validation failure, which may be due to mismatch of received data, data may be received correctly but with unacceptable time delay, etc., further user access to the services may be denied.

Figure 3A:
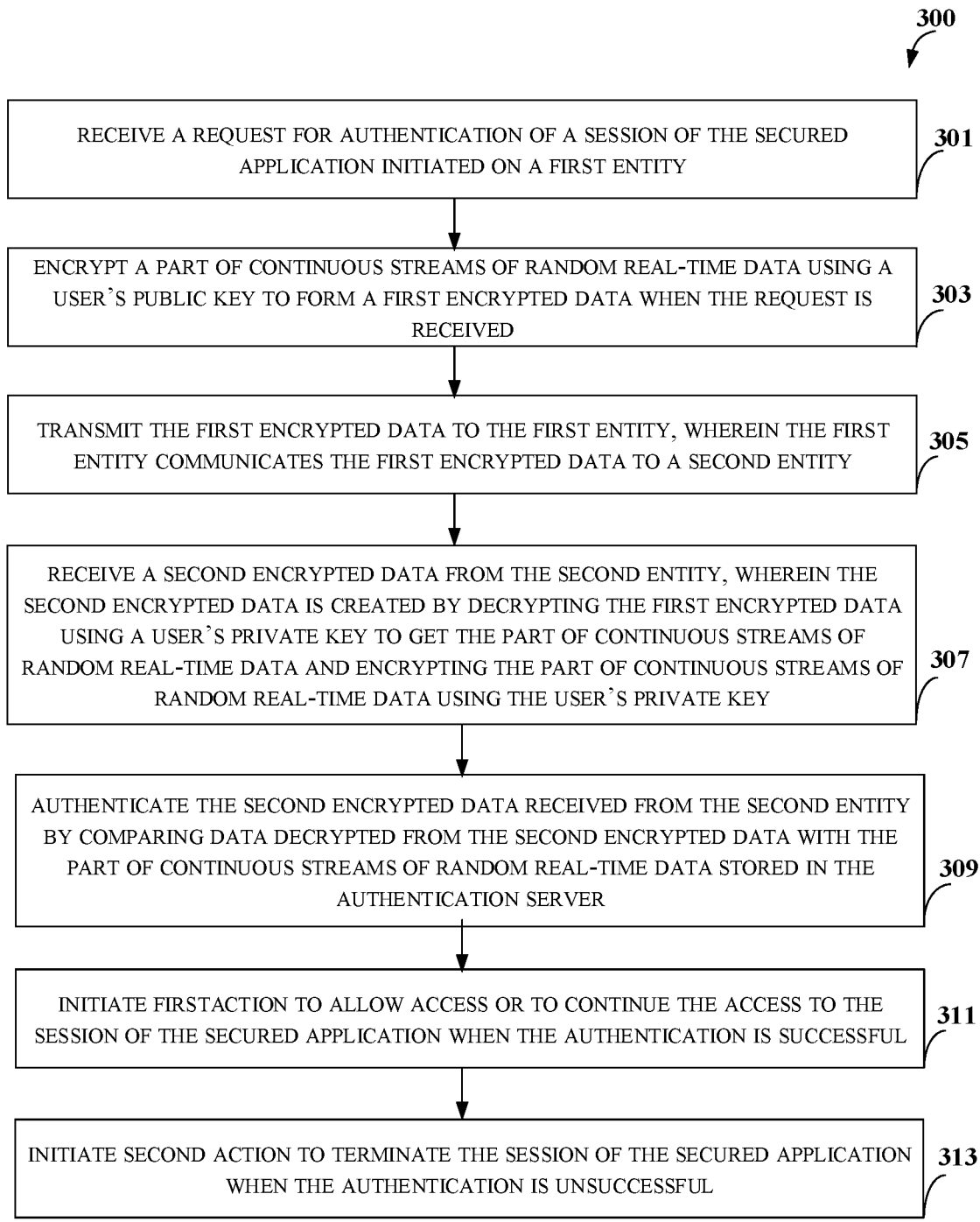
FIGS. 3a and 3b illustrate flowcharts showing a method of authentication adaptive to a secured application in accordance with some embodiments of present disclosure and FIG. 4 shows an exemplary marker added between two data blocks, in accordance with some embodiments of present disclosure.
Figure 3B:
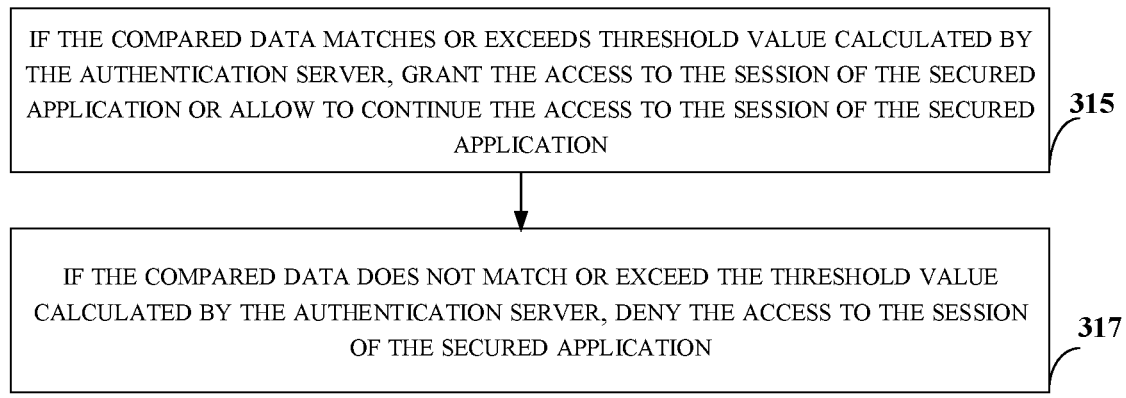

FIGS. 3*a* and 3*b* illustrate flowcharts showing a method of authentication adaptive to a secured application in accordance with some embodiments of present disclosure.

As illustrated in FIGS. 3*a* and 3*b*, the method 300 includes one or more blocks for authentication adaptive to a secured application. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the authentication server 103 may receive a request for authentication of a session of the secured application initiated on a first entity 105.

At block 303, the authentication server 103 may encrypt a part of continuous streams of random real-time data using a user's public key to form a first encrypted data when the request is received at block 301. The continuous streams of random real-time data generation may be based on at least one of dynamic parameters and random severity score. The random severity score may depend on a type of the secured application. The dynamic parameters may comprise at least one of matching factor, maximum acceptable time delay, buffer size of the first entity and the second entity, type of data, data rate, the type of the secured application, type of the first entity and the second entity, network latency among the authentication server, the first entity and the second entity, type of communication mechanism used between the first entity and the second entity and technical limitations of the communication mechanism used between the first entity and the second entity.

At block 305, the authentication server 103 may transmit the first encrypted data to the first entity 105. The first entity 105 may communicate the first encrypted data to a second entity 107. The second entity 107 may be registered with the authentication server 103. The communication mechanism between the first entity and the second entity may comprise wired, Wi-Fi, Bluetooth, Near Field Communication (NFC) and modulation techniques to convert data to audio, video, vibration and light transfer.

At block 307, the authentication server 103 may receive a second encrypted data from the second entity 107. The second encrypted data may be created by decrypting the first encrypted data using a user's private key to get the part of continuous streams of random real-time data and encrypting the part of continuous streams of random real-time data using the user's private key.

At block 309, the authentication server 103 may authenticate the second encrypted data received from the second entity 107 by comparing data decrypted from the second encrypted data with the part of continuous streams of random real-time data stored in the authentication server 103.

At block 311, the authentication server 103 may initiate first action to allow access or to continue the access to the session of the secured application when the authentication is successful.

At block 313, the authentication server 103 may initiate second action to terminate the session of the secured application when the authentication is unsuccessful.

At block 315, the authentication server 103 may grant the access to the session of the secured application or allow to continue the access to the session of the secured application if the compared data matches or exceeds threshold value calculated by the authentication server 103.

At block 317, the authentication server 103 may deny the access to the session of the secured application if the compared data does not match or exceed the threshold value calculated by the authentication server.

A technical solution, as an example, is presented below based on FIGS. 3a and 3b.

Consider a banking environment comprising of the authentication server 103, the first entity 105, the second entity 107 and the service provider 101. Here the type of application is of banking type. Table 1 below shows a banking environment and respective parameters considered for this example.

TABLE 1

| Banking Environment | Parameters |
| --- | --- |
| First entity 105 | User's laptop from which user accesses service provider's services |
| Second entity 107 | User's smartphone, which is already registered with the service provider 101 |
| Service provider 101 | XYZ Banking Ltd. |
| Primary authentication | Userid and static password |
| Authentication server 103 | Bank authentication server |

Following presents the technical solution based on the present disclosure:

A user wants to perform a transaction on his bank website. The user opens the bank website in his/her laptop and enters his/her bank account number/UserID and password. On successful login, the bank website lists all user's registered entities and asks the user to pick one entity for current transaction. On selection of one entity (for e.g. smartphone), bank authentication server indicates the user laptop and user smartphone to establish communication (for e.g. using Bluetooth). Once the communication between the user laptop and the user smartphone is established, the bank authentication server begins the real-time continuous data stream transmission to the user smartphone via the user laptop and receives the data back at the bank authentication server. This process of real-time continuous data transmission from and to the bank authentication server happens continuously in the background while the user performs his/her bank transaction. The user is never interrupted thereafter for authentication till he/she completes all his/her transactions; irrespective of the time it takes to complete all the transactions. Once user has completed all his/her transactions, the user logs out of the bank website. The bank authentication server then informs the user laptop, the user smartphone and terminates the real-time data transmission and ends the authentication process.

Following present the working principle behind the technical solution provided above based on the present disclosure:

When the user wants to access his/her XYZ Banking Ltd's bank account, he/she begins by accessing the bank website from the laptop. Once the primary authentication is successful, the bank website lists all the user's registered entities from which the user has to select one entity for authentication. Assuming, he/she selects smartphone as the entity for authentication, the smartphone should be available and be connected to internet all the time till completion of the transaction. Based on the primary authentication, Service Provider Unit (SPU, not shown in FIG. 2) at the service provider identifies the user and forwards the request to the bank authentication server 103, especially to the MCU 203. Upon receiving the request, the MCU 203 invokes the DPCU 201 to initiate the process of dynamic parameter calculation. It configures the Entity Control Units (ECUs, not shown in FIG. 2) within the user's laptop and the user's smartphone with the calculated parameter values. Sample test data is sent to the user's laptop and received from the user's smartphone to calculate the network latency. The MCU 203 detect the technical capabilities of the devices (i.e. user's laptop and user's smartphone) by communicating with the ECUs. The values received are passed on to the DPCU 201 where the matching factor and maximum acceptable time delay are calculated and sent back to the MCU 203.

Once the dynamic parameters are configured and the ECUs are informed to start reception of data, the MCU 203 triggers the CDGU 205 to start the random data stream generation. The data stream that is continuously generated gets sliced and formatted in the DSFU 207 and is stored in the DR 215 for further validation. The data slice value can change dynamically and continuously based on the values calculated by the DPCU 201. The EDU 211 receives the formatted data and encrypts it using the user's Public Key, retrieved from the Key Store 213. Before the start of data transmission between the user's laptop and the user's smartphone, the ECUs trigger their respective Connectivity Unit (CU, not shown in FIG. 2) to establish a connection between the entities using a communication mechanism such as Bluetooth.

As the data gets encrypted at the authentication server 103, it is stored in the DR 215 in unencrypted form. The ASDTMU 219 in the authentication server 103 transmits the data to the user laptop. As the data gets transmitted, its timestamp is stored against the unencrypted data in the DR 215. The data is received by the Data Reception Unit (DRU, not shown in FIG. 2) of the user's laptop, modulated (if required) and transmitted to the user's smartphone with the help of laptop's Data Transmission Unit (DTU, not shown in FIG. 2). During the data transmission process, if there is any communication disconnect, it is detected, and the communication is re-established by CUs.

As the DRU of the user's smartphone receives data from the user's laptop, it is demodulated (if required), decrypted, encrypted using the Encryption/Decryption Unit (EDU, not shown in FIG. 2) by retrieving user's Private Key from Key Store (not shown in FIG. 2) of the user's smartphone. Once the data encryption is done, the DTU transmits the data to the authentication server 103.

The ASDRU 209 of authentication server 103, upon receiving the data, slices the data using the DSFU 207, decrypts using the EDU 211. The EDU 211 retrieves user's Public Key from the Key Store 213 for decryption of the received data. After decryption, the data is validated at the DVU 217. The DVU 217 retrieves the stored data and the timestamps from the DR 215, derives the matching factor and time delay values. These values are then compared against the expected matching factor and maximum acceptable time delay values (calculated by the DPCU 201). If the requirements are met, data validation is considered as successful. On successful validation of data, the user is granted access or is allowed to continue his/her access to the services provided. If the data valuation fails, further access to all the services is denied.

During the entire process, if there is any disruption in communication between user's laptop, the user's smartphone and the authentication server 103 or if the time delay between transmitted and received data is more than expected, the user's access to the XYZ Banking Ltd services will be denied and the data transmission from the authentication server 103 will stop. If the user logs out from the bank website, after completion of his/her transaction, the real-time continuous data transmission stops. In both the above cases, the authentication server 103 will inform the user's smartphone to stop the data collection.

Some of the advantages of the present disclosure are listed below.

In the present disclosure, there is no dependency on user's mobile phone SIM card. Therefore, the present disclosure is not prone to SIM swap attacks.

Unlike OTP, the present disclosure is not prone to theft by any person in the vicinity of a user accessing an application.

In the present disclosure, the data stream received by second entity is encrypted or signed using a private key installed on user device and subsequently sent to an authentication server. Therefore, the data stream is secured and cannot be tampered.

In the present disclosure, an authentication server can confirm the identity of user by decrypting received data or verifying signature using the public key corresponding to private key installed on second entity. This verification of user identity is continuous till completion of transaction or till user logs out and not intermittent as in the case of OTP.

The present disclosure provides a seamless user experience without interrupting the user till user logs out or completes a transaction while still continuously verifying the identity of user.

Unlike OTP, in the present disclosure, there is no cost involved for service provider to send SMS.

In the present disclosure, the real-time continuous data stream is randomly generated for each user and for each session. Therefore, this approach is secured and cannot be predicted or reproduced by a hacker.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3a and 3b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 101 | Service provider |
| 103 | Authentication server |
| 105 | First entity |
| 107 | Second entity |
| 201 | Dynamic Parameters Configuration Unit (DPCU) |
| 203 | Master Control Unit (MCU) |
| 205 | Continuous Data Stream Generation Unit (CDGU) |
| 207 | Data Slicing and Formatting Unit (DSFU) |

| Reference number | Description |
| --- | --- |
| 209 | Authentication Server Data Reception Unit (ASDRU) |
| 211 | Data Encryption/Decryption Unit (EDU) |
| 213 | Key Store |
| 215 | Data Repository (DR) |
| 217 | Data Valuator Unit (DVU) |
| 219 | Authentication Server Data Transmission Unit (ASDTMU) |

What is claimed is:

1. A method of authentication adaptive to a secured application, when the secured application initiates an authentication request, the method comprising:
   receiving, by an authentication server, a request for authentication of a session of the secured application initiated on a first entity;
   encrypting, by the authentication server, a part of continuous streams of random real-time data using a user's public key to form a first encrypted data when the request is received, wherein a continuous stream of random real-time data is randomly generated for each user and for each session and wherein timestamps of the part of continuous streams of random real-time data are stored on the authentication server against an unencrypted form of the part of continuous streams of random real-time data;
   transmitting, by the authentication server, the first encrypted data to the first entity, wherein the first entity communicates the first encrypted data to a second entity;
   receiving, by the authentication server, a second encrypted data from the second entity, wherein the second encrypted data is created by decrypting the first encrypted data using a user's private key to get the part of continuous streams of random real-time data and encrypting the part of continuous streams of random real-time data using the user's private key;
   deriving, by the authentication server, a matching factor and time delay values from the stored timestamps against the unencrypted form of the part of continuous streams of random real-time data stored on the authentication server;
   authenticating, by the authentication server, the second encrypted data received from the second entity by comparing data the matching factor and time delay values decrypted from the second encrypted data with the matching factor and time delay values derived from the stored timestamps against the unencrypted form of the part of continuous streams of random real-time data stored in the authentication server;
   initiating, by the authentication server, first action to allow access or to continue the access to the session of the secured application when the authentication is successful; and
   initiating, by the authentication server, second action to terminate the session of the secured application when the authentication is unsuccessful.

2. The method as claimed in claim 1, wherein the second entity is registered with the authentication server.

3. The method as claimed in claim 1, wherein the continuous streams of random real-time data generation are based on at least one of dynamic parameters and random severity score.

4. The method as claimed in claim 3, wherein the random severity score depends on a type of the secured application.

5. The method as claimed in claim 3, wherein the dynamic parameters comprise at least one of matching factor, maximum acceptable time delay, buffer size of the first entity and the second entity, type of data, data rate, the type of the secured application, type of the first entity and the second entity, network latency among the authentication server, the first entity and the second entity, type of communication mechanism used between the first entity and the second entity and technical limitations of the communication mechanism used between the first entity and the second entity.

6. The method as claimed in claim 1, wherein communication mechanism between the first entity and the second entity comprises wired, Wi-Fi, Bluetooth, Near Field Communication (NFC) and modulation techniques to convert data to audio, video, vibration and light transfer.

7. The method as claimed in claim 1, wherein the first entity and the second entity are a same device.

8. The method as claimed in claim 1, wherein the initiating first action to allow access or to continue the access to the session of the secured application comprises:
   if the compared data matches or exceeds threshold value calculated by the authentication server, granting, by the authentication server, the access to the session of the secured application or allowing, by the authentication server, to continue the access to the session of the secured application.

9. The method as claimed in claim 1, wherein the initiating second action to terminate the session of the secured application comprises:
   if the compared data does not match or exceed the threshold value calculated by the authentication server, denying, by the authentication server, the access to the session of the secured application.

10. An authentication server for authentication adaptive to a secured application, the server comprising:
    a processor; and
    a memory communicatively coupled to the processor, wherein the memory stores processor-executable instructions, which on execution, cause the processor to:
      receive a request for authentication of a session of the secured application initiated on a first entity;
      encrypt a part of continuous streams of random real-time data using a user's public key to form a first encrypted data when the request is received, wherein a continuous stream of random real-time data is randomly generated for each user and for each session and wherein timestamps of the part of continuous streams of random real-time data is stored on the authentication server against an unencrypted form of the part of continuous streams of random real-time data;
      transmit the first encrypted data to the first entity, wherein the first entity communicates the first encrypted data to a second entity;
      receive a second encrypted data from the second entity, wherein the second encrypted data is created by decrypting the first encrypted data using a user's private key to get the part of continuous streams of random real-time data and encrypting the part of continuous streams of random real-time data using the user's private key;
      derive a matching factor and time delay values from the stored timestamps against the unencrypted form of the part of continuous streams of random real-time data stored on the authentication server;

authenticate the second encrypted data received from the second entity by comparing data the matching factor and time delay values decrypted from the second encrypted data with the matching factor and time delay values derived from the stored timestamps against the unencrypted form of the part of continuous streams of random real-time data stored in the authentication server;

initiate first action to allow access or to continue the access to the session of the secured application when the authentication is successful; and initiate second action to terminate the session of the secured application when the authentication is unsuccessful.

11. The authentication server as claimed in claim 10, wherein the second entity is registered with the authentication server.

12. The authentication server as claimed in claim 10, wherein the continuous streams of random real-time data generation are based on at least one of dynamic parameters and random severity score.

13. The authentication server as claimed in claim 12, wherein the random severity score depends on a type of the secured application.

14. The authentication server as claimed in claim 12, wherein the dynamic parameters comprise at least one of matching factor, maximum acceptable time delay, buffer size of the first entity and the second entity, type of data, data rate, the type of the secured application, type of the first entity and the second entity, network latency among the authentication server, the first entity and the second entity, type of communication mechanism used between the first entity and the second entity and technical limitations of the communication mechanism used between the first entity and the second entity.

15. The authentication server as claimed in claim 10, wherein communication mechanism between the first entity and the second entity comprises wired, Wi-Fi, Bluetooth, Near Field Communication (NFC) and modulation techniques to convert data to audio, video, vibration and light transfer.

16. The authentication server as claimed in claim 10, wherein the first entity and the second entity are a same device.

17. The authentication server as claimed in claim 10, the server causes the processor to:

grant the access to the session of the secured application or allow to continue the access to the session of the secured application, if the compared data matches or exceeds threshold value calculated by the authentication server.

18. The authentication server as claimed in claim 10, the server causes the processor to:

deny the access to the session of the secured application, if the compared data does not match or exceed the threshold value calculated by the authentication server.

19. A non-transitory computer readable medium including instructions stored thereon that when processed by at least one processor cause an authentication server to perform operations comprising:

receiving a request for authentication of a session of the secured application initiated on a first entity;

encrypting a part of continuous streams of random real-time data using a user's public key to form a first encrypted data when the request is received, wherein a continuous stream of random real-time data is randomly generated for each user and for each session and wherein timestamps of the part of continuous streams of random real-time data is stored on the authentication server against an unencrypted form of the part of continuous streams of random real-time data;

transmitting the first encrypted data to the first entity, wherein the first entity communicates the first encrypted data to a second entity;

receiving a second encrypted data from the second entity, wherein the second encrypted data is created by decrypting the first encrypted data using a user's private key to get the part of continuous streams of random real-time data and encrypting the part of continuous streams of random real-time data using the user's private key;

deriving, by the authentication server, a matching factor and time delay values from the stored timestamps against the unencrypted form of the part of continuous streams of random real-time data stored on the authentication server;

authenticating the second encrypted data received from the second entity by comparing the matching factor and time delay values decrypted from the second encrypted data with the matching factor and time delay values derived from the stored timestamps against the unencrypted form of the part of continuous streams of random real-time data stored in the authentication server;

initiating first action to allow access or to continue the access to the session of the secured application when the authentication is successful; and initiating second action to terminate the session of the secured application when the authentication is unsuccessful.

20. The medium as claimed in claim 19, wherein the instructions when processed by the at least one processor cause the authentication server to perform operations comprising:

granting the access to the session of the secured application or allow to continue the access to the session of the secured application, if the compared data matches or exceeds threshold value calculated by the authentication server.

* * * * *